United States Patent
Sawai et al.

(10) Patent No.: US 8,447,861 B2
(45) Date of Patent: May 21, 2013

(54) COMMUNICATION DEVICE, COMMUNICATION CONTROL METHOD AND PROGRAM

(75) Inventors: Ryo Sawai, Tokyo (JP); Ryota Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 12/784,939

(22) Filed: May 21, 2010

(65) Prior Publication Data

US 2010/0302948 A1  Dec. 2, 2010

(30) Foreign Application Priority Data

May 29, 2009 (JP) ................. P2009-130092
Jan. 20, 2010 (JP) ................. P2010-010407

(51) Int. Cl.
*G06F 15/173* (2006.01)

(52) U.S. Cl.
USPC ........................................... 709/226

(58) Field of Classification Search .......... 455/403, 455/422.1, 446, 447, 450, 454, 436, 442; 700/90, 700/95, 97, 99; 709/223, 226; 370/310, 328, 370/329, 331
See application file for complete search history.

(56) References Cited

U.S. PATENT DOCUMENTS

| | | | |
|---|---|---|---|
| 7,881,726 B2 * | 2/2011 | Gurney et al. | 455/454 |
| 8,085,751 B2 * | 12/2011 | Oh et al. | 370/345 |
| 2004/0023658 A1 | 2/2004 | Karabinis et al. | |
| 2004/0109432 A1 * | 6/2004 | Laroia et al. | 370/343 |
| 2008/0170539 A1 * | 7/2008 | Hyon et al. | 370/328 |
| 2008/0233946 A1 | 9/2008 | Henry | |
| 2008/0240024 A1 | 10/2008 | Rao et al. | |
| 2008/0268892 A1 | 10/2008 | Hamdi et al. | |
| 2008/0291856 A1 * | 11/2008 | Li et al. | 370/311 |

FOREIGN PATENT DOCUMENTS

| | | |
|---|---|---|
| EP | 1 571 861 | 9/2005 |
| WO | WO 95/27381 | 10/1995 |
| WO | WO 01/97430 | 12/2001 |

OTHER PUBLICATIONS

"IEEE 802.22 WG on WRAN's (Wireless Regional Area Networks)," IEEE 802 LAN/MAN Standards Committee, http://www.ieee802.org/22/, 1 page, searched on Jan. 5, 2009.

(Continued)

*Primary Examiner* — Fan Ng
(74) *Attorney, Agent, or Firm* — Finnegan, Henderson, Farabow, Garrett & Dunner, LLP (57) ABSTRACT

There is provided a communication device including: a data acquisition unit that acquires sensed data related to a signal receiving condition in a spectrum assigned to a first communication service; a determination unit that determines which of a first area inside a service area of the first communication service where a signal receiving condition is suitable, a second area inside or in a peripheral part of the service area where a signal receiving condition is not suitable and a third area outside the peripheral part of the service area the communication device is located based on the sensed data acquired by the data acquisition unit; and a secondary usage starting unit that starts usage of a second communication service using a part or whole of the spectrum assigned to the first communication service by a procedure different depending on a kind of the area where the communication device is located determined by the determination unit.

24 Claims, 8 Drawing Sheets

OTHER PUBLICATIONS

"Unlicensed Operation in the TV Broadcast Bands," FCC 08-260, Second Report and Order and Memorandum Opinion and Order Before the Federal Communications Commission, Adpoted Nov. 4, 2008, Released Nov. 14, 2008, http://hraunfoss.fcc.gov/edocs_public/attachmatch/FCC-08-260A1.pdf, pp. 1-130, searched on Jan. 5, 2009.

* cited by examiner

COMMUNICATION DEVICE, COMMUNICATION CONTROL METHOD AND PROGRAM

BACKGROUND OF THE INVENTION

1. Field of the Invention

The present invention relates to a communication device, a communication control method and a program.

2. Description of the Related Art

Discussions have been taking place recently regarding secondary usage of a spectrum assigned for primary usage to provide a secondary communication service depending on the use condition of the spectrum. For example, the standard specification for allowing an unused channel contained in a spectrum of the U.S. digital TV broadcast (TV white spaces) to be available for radio communication has been studied in the IEEE802.22 working group ("IEEE802.22 WG on WRANs", [online], [Searched on Jan. 5, 2009], cf. Internet <URL: http://www.ieee802.org/22/>). Further, according to the report from the Federal Communications Commission (FCC) on November 2008, the discussions are directed toward permitting secondary usage of TV white spaces by using specific communication devices that have been authorized by fulfilling a certain criterion ("Second Report and Order and Memorandum Opinion and Order", [online], [Searched on Jan. 5, 2009], cf. Internet <URL: http://hraunfoss.fcc.gov/edocs_public/attachmatch/FCC-08-260A1.pdf>). In addition, there are moves, led by the EU, afoot to universally allocate a dedicated control channel called the cognitive pilot channel (CPC) for making dynamic spectrum access (DSA). Technological studies for a secondary usage system that makes DSA are also being progressed in IEEE Standards Coordinating Committee (SCC) 41.

SUMMARY OF THE INVENTION

However, secondary usage of the above-described white space, which is an unused spectrum in an area where a communication service related to primary usage (which is referred to hereinafter as a first communication service) is not provided does not lead to fully effective utilization of a limited spectrum. One reason is that secondary usage of the white space is utilization of a spectrum that is apparently available throughout a long or medium term in a particular region, and an actual opportunity of usage is limited to an area where there are only a small number of users of the first communication service. Further, as for secondary usage of the TV white space in the United States, for example, it is predicted that part of the spectrum is auctioned and a spectrum left for secondary usage is small. Therefore, if the target of secondary usage is limited to the white space, an issue of the future shortage of spectrums is not likely to be solved.

In light of the foregoing, it is desirable to provide a novel and improved communication device, communication control method and program that achieve efficient secondary usage of a spectrum in an area not limited to the white space.

According to an embodiment of the present invention, there is provided a communication device including a data acquisition unit that acquires sensed data related to a signal receiving condition in a spectrum assigned to a first communication service, a determination unit that determines which of a first area inside a service area of the first communication service where a signal receiving condition is suitable, a second area inside or in a peripheral part of the service area where a signal receiving condition is not suitable and a third area outside the peripheral part of the service area the communication device is located based on the sensed data acquired by the data acquisition unit and a secondary usage starting unit that starts usage of a second communication service using a part or whole of the spectrum assigned to the first communication service by a procedure different depending on a kind of the area where the communication device is located determined by the determination unit.

In this configuration, the kind of the area where the communication device is located is determined by the determination unit based on the sensed data related to a signal receiving condition that is sensed or collected by the data acquisition unit. The kind of the area where the communication device is located is either one of the first area inside a service area of the first communication service where a signal receiving condition is suitable, the second area inside or in a peripheral part of the service area where a signal receiving condition is not suitable, and the third area outside the peripheral part of the service area. The peripheral part of the service area of the first communication service is an area that is not included in the service area of the first communication service, but when a communication device located in the area transmits a radio signal having a normal transmission power level, there is a possibility that an effect such as interference is given to the quality of the first communication service. Further, the area outside the peripheral part is an area that is sufficiently distant from the service area, and transmission of a radio signal from a communication device located in the area does not normally give an effect to the quality of the first communication service or the like. Then, secondary usage of a spectrum assigned to the first communication service is started by a procedure different depending on the kind of the area. It is thereby possible to efficiently make secondary usage of the first communication service in an area not limited to the white space depending on the environment of the area.

When it is determined that the communication device is located in the second area or the third area, the secondary usage starting unit may start usage of the second communication service without requesting permission to a coordinator of the first communication service.

When it is determined that the communication device is located in the second area, the secondary usage starting unit may detect a time slot, a frequency slot or a code not used in nearby vicinity of the communication device in the spectrum and starts usage of the second communication service by using the detected time slot, frequency slot or code.

When it is determined that the communication device is located in the second area, the secondary usage starting unit may limit a power level of a transmission signal for the second communication service within a range determined based on the sensed data.

The determination unit may determine whether the communication device is located in the first area or not based on a signal level of a received signal in the spectrum.

The determination unit may further determine which of the second area and the third area the communication device is located based on a degree of fading appearing in a received signal in the spectrum.

The determination unit may determine that the communication device is located in the third area when a control channel or an uplink signal of the first communication service is not detected.

When it is determined that the communication device is located in the first area, the secondary usage starting unit may request permission for starting usage of the second communication service to a coordinator of the first communication service.

The communication device may further include a secondary usage extending unit that extends a service area of the second communication service by negotiating with another communication device located in nearby vicinity of the communication device and using the second communication service under permission of a coordinator of the first communication service.

According to another embodiment of the present invention, there is provided a communication control method including the steps of acquiring sensed data related to a signal receiving condition in a spectrum assigned to a first communication service, determining which of a first area inside a service area of the first communication service where a signal receiving condition is suitable, a second area inside or in a peripheral part of the service area where a signal receiving condition is not suitable and a third area outside the peripheral part of the service area the communication device is located based on the acquired sensed data and starting usage of a second communication service using a part or whole of the spectrum assigned to the first communication service by a procedure different depending on a kind of the area where the communication device is located.

According to another embodiment of the present invention, there is provided a program causing a computer controlling a communication device to implement functions including a data acquisition unit that acquires sensed data related to a signal receiving condition in a spectrum assigned to a first communication service, a determination unit that determines which of a first area inside a service area of the first communication service where a signal receiving condition is suitable, a second area inside or in a peripheral part of the service area where a signal receiving condition is not suitable and a third area outside the peripheral part of the service area the communication device is located based on the sensed data acquired by the data acquisition unit and a secondary usage starting unit that starts usage of a second communication service using a part or whole of the spectrum assigned to the first communication service by a procedure different depending on a kind of the area where the communication device is located determined by the determination unit.

According to the embodiments of the present invention described above, it is possible to provide a communication device, a communication control method and a program that achieve efficient secondary usage of a spectrum in an area not limited to the white space.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

Figure 1:
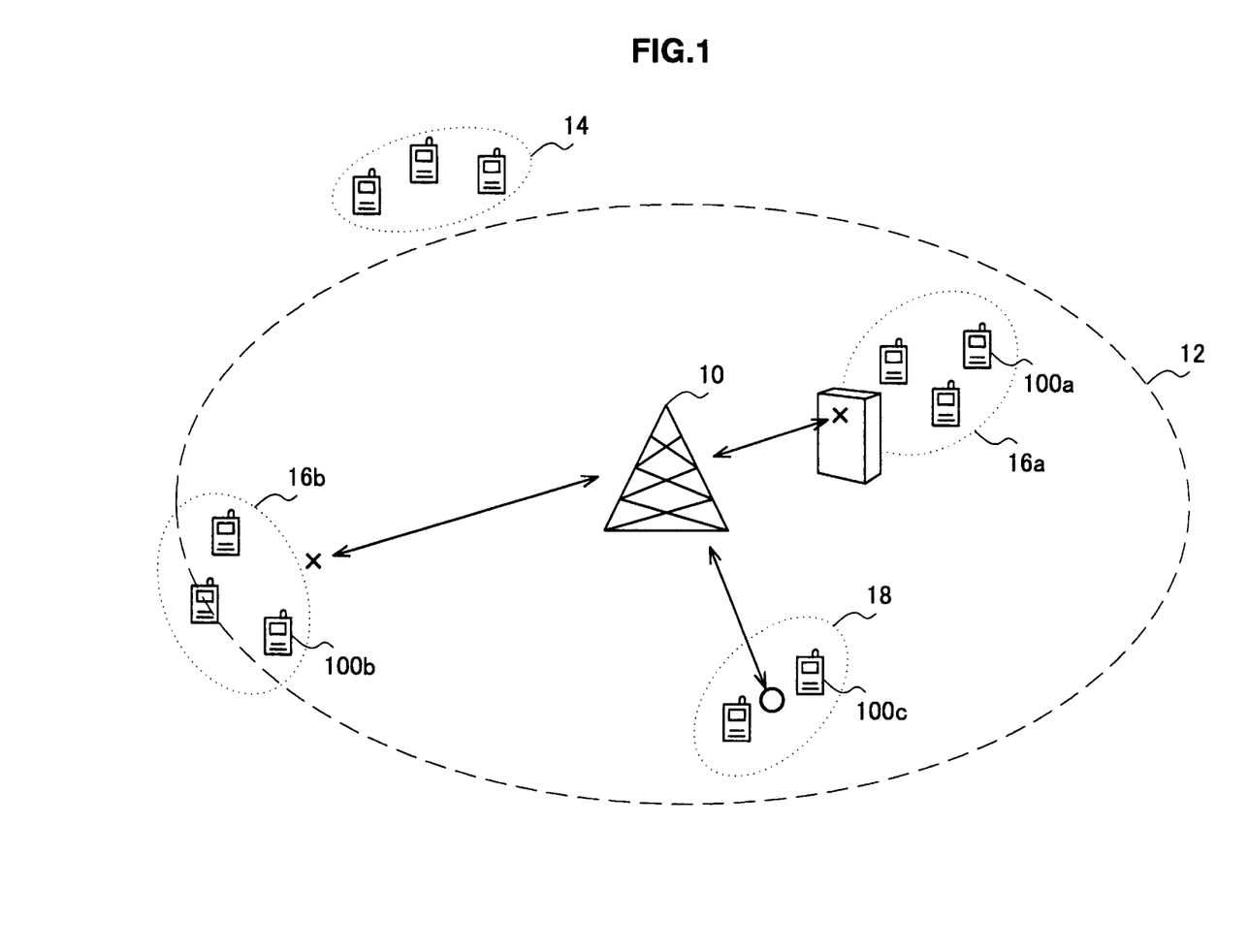
FIG. 1 is a schematic view showing an overview of secondary usage of a spectrum.

1. Overview of Secondary Usage of Spectrum
2. Description of First Embodiment
2-1. Configuration of Communication Device
2-2. Flow of Processing
3. Description of Second Embodiment
3-1. Configuration of Communication Device
3-2. Flow of Processing 1. Overview of Secondary Usage of Spectrum An overview of secondary usage of a spectrum according to an embodiment of the present invention is described hereinafter with reference to FIG. 1. FIG. 1 shows a base station 10 and a plurality of communication devices located inside or outside a service area 12 of a first communication service centering on the base station 10.

The base station 10 provides the first communication service to communication devices located inside the service area 12 by using a given spectrum. The first communication service may be an arbitrary communication service such as a digital TV broadcast service or a mobile phone connection service. Further, the base station 10 can operate as a so-called coordinator that determines the availability of start or extension of secondary usage in the given spectrum assigned to the first communication service. In this case, the base station 10 verifies whether to permit start or extension of secondary usage in response to a request from a communication device that intends to make secondary usage of a spectrum assigned to the first communication service. At this time, the base station 10 may designate or recommend a parameter such as a transmission power to be used for secondary usage. Further, the base station 10 may also serve as a data server that stores data related to a communication environment of the first communication service in an integral manner. In this case, the base station 10 stores data of a frequency currently in use for each location inside the service area 12, use history data of a frequency for each location, predicted data related to a condition of traffic predicted from the use history data and so on.

FIG. 1 also shows areas 14, 16a, 16b and 18 in which a plurality of communication devices are located, inside or outside the service area 12. The area 14 is an area outside the peripheral part of the service area 12 of the first communication service, which is a so-called white space. In this case, even if a communication device located in the area 14 transmits a radio signal, an effect such as interference is not usually given to the first communication service.

On the other hand, the areas 16a, 16b and 18 are areas inside and in the peripheral part of the service area 12 of the first communication service. For example, a communication device 100a located in the area 16a is unable to suitably receive a radio signal transmitted from the base station 10 because the radio signal is blocked by a building. In this manner, there may be an area where it is difficult to use the first communication service due to shadowing (shielding) or the like inside the service area 12 of the first communication service. Such an area is sometimes called "spectrum hole" because it appears as if there is a spatial "hole" in the spectrum of the first communication service. Further, a communication device 100b located in the area 16b, for example, is subject to fading because a distance from the base station 10 is not close and thus unable to suitably receive a radio signal transmitted from the base station 10. When a communication device is located in an area where a signal receiving condition is not suitable such as the spectrum hole or the peripheral part of the service area, secondary usage of a spectrum is possible without an adverse effect on the first communication service by limiting a power level of a transmission signal from the communication device. In this specification, an area inside or in the peripheral part of a given service area where a signal receiving condition is relatively unsuitable and where secondary usage of a spectrum is possible by limiting a power level of a transmission signal is called "gray space (gray area)" in contrast to the white space. Secondary usage of a spectrum assigned to the first communication service in the gray space is useful for a user who is unable to suitably use the first communication service.

The area 18 is an area inside the service area 12 of the first communication service. A communication device 100c located in the area 18, for example, is able to suitably receive a radio signal transmitted from the base station 10. However, a spectrum assigned to the first communication service is not necessarily used thoroughly (densely) in the service area 12. In such a case, the communication device 100c can make efficient use of the spectrum by making secondary usage of the spectrum assigned to the first communication service under permission of the base station 10, which is a coordinator of the first communication service. In this specification, a network area for secondary usage of a spectrum established under permission of a coordinator of the first communication service is called "green space (green area)".

As described above, technological studies for secondary usage of the white space, which is an area outside the service area 12 of the first communication service, have been carried out. On the other hand, technological studies for secondary usage of a spectrum in the above-described gray space or green space have not been sufficiently carried out. In light of this, a suitable configuration of a communication device and a process flow for making secondary usage of a spectrum in the gray space or the green space according to a communication environment of the first communication service are described specifically hereinbelow.

In this specification, the term "secondary usage" typically means utilization of an additional or alternative communication service (a second communication service) using a part or whole of a spectrum assigned to a first communication service as described above. In this context about the meaning of the term "secondary usage", the first communication service and the second communication service may be services of different types or the same type. The services of different types may be selected from services such as digital TV broadcasting service, satellite communication service, mobile communication service, wireless LAN access service, P2P (Peer To Peer) connection service and the like. On the other hand, services of the same type may contain, for example, a relationship between a service of macro-cell provided by a communication carrier and a service of femto-cell operated by users or MVNO (Mobile Virtual Network Operator). Additionally, services of the same type may contain, for example, a relationship between a service provided by a base station of a communication service according to WiMAX, LTE (Long Term Evolution), LTE-A (LTE-Advanced) or the like and a service provided by relay station (relay node) to cover a spectrum hole. Further, a second communication service may be a service utilizing a plurality of fragmentary frequency bands aggregated using spectrum aggregation technology. Furthermore, a second communication service may be a supplementary communication service provided by femto-cells, relay stations or small or medium sized base stations for smaller service area than normal sized base stations within a service area of a normal sized base station. The subject matter of each embodiment described in this specification is applicable to every type of mode of such secondary usages.

2. Description of First Embodiment 2-1. Configuration of Communication Device (Example of Hardware Configuration)

Figure 2:
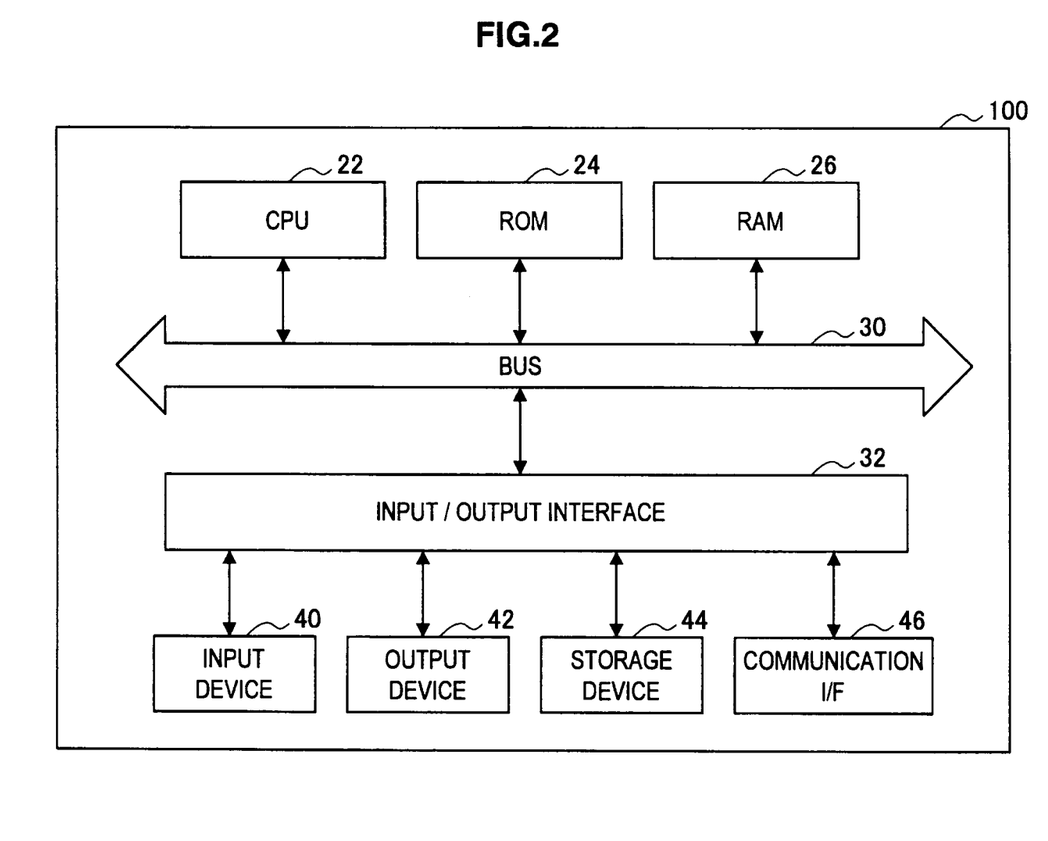
FIG. 2 is a block diagram showing an example of a hardware configuration of a communication device according to a first embodiment.

FIG. 2 is a block diagram showing an example of a hardware configuration of a communication device 100 according to a first embodiment of the present invention. Referring to FIG. 2, the communication device 100 includes a central processing unit (CPU) 22, read only memory (ROM) 24, random access memory (RAM) 26, a bus 30, an input/output interface 32, an input device 40, an output device 42, a storage device 44 and a communication interface (I/F) 46.

The CPU 22 controls the operation of the communication device 100 as a whole. The ROM 24 stores programs executed by the CPU 22, data and so on. The RAM 26 temporarily stores a program or data during execution of processing by the CPU 22. The CPU 22, the ROM 24 and the RAM 26 are connected with one another through the bus 30. The input/output interface 32 is also connected to the bus 30. The input/output interface 32 connects the CPU 22, the ROM 24 and the RAM 26 with the input device 40, the output device 42, the storage device 44 and the communication interface 46.

The input device 40 receives an instruction or information input from a user through a button, a switch, a lever, a mouse, a keyboard, a touch panel or the like, for example. The instruction from a user includes an instruction for starting secondary usage of a spectrum or the like, for example. The output device 42 outputs information to a user through a display device such as a cathode ray tube (CRT), a liquid crystal display or an organic light emitting diode (OLED), or an audio output device such as a speaker, for example. The information output to a user includes information for notifying success or failure of start of secondary usage of a spectrum or the like, for example. The storage device 44 is made up of a hard disk drive or flash memory, for example, and stores programs, data and so on. The communication interface 46 mediates communication processing for the first communication service or the second communication service.

Each of the functions of the communication device 100 described later may be implemented as software, for example. In the case where each function is implemented as software, a program constituting software is stored in the ROM 24 or the storage device 44 shown in FIG. 2, loaded to the RAM 26 upon execution and executed by the CPU 22, for example. Alternatively, each function may be implemented as hardware by using a dedicated processor which is additionally mounted to the communication device 100.

(Example of Logical Configuration)

Figure 3:
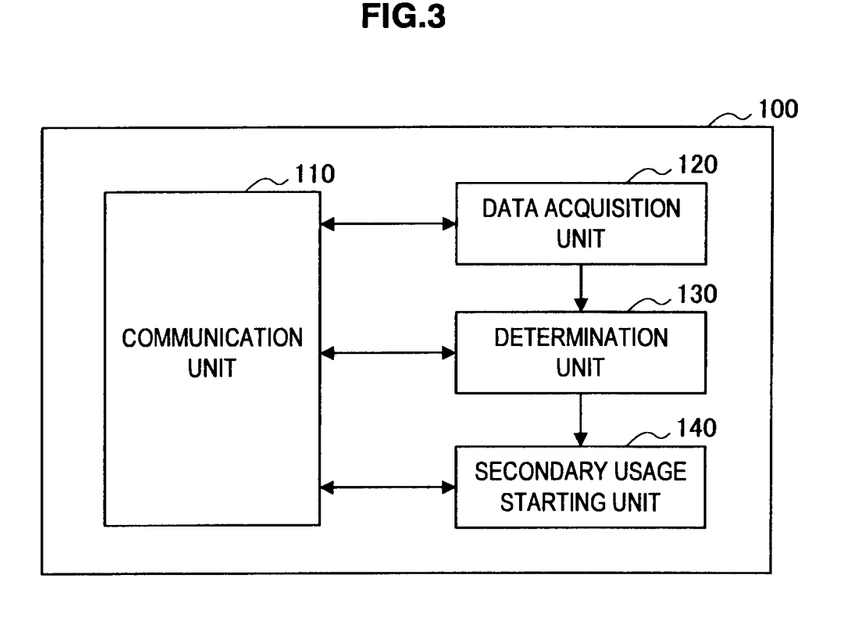
FIG. 3 is a block diagram showing an example of a logical configuration of a communication device according to the first embodiment.

FIG. 3 is a block diagram showing an example of a logical configuration of the communication device 100 according to the embodiment. Referring to FIG. 3, the communication device 100 includes a communication unit 110, a data acquisition unit 120, a determination unit 130 and a secondary usage starting unit 140.

The communication unit 110 receives radio signals reaching the communication device 100 and transmits radio signals to another communication device with use of the communication interface 46 shown in FIG. 2. Radio signals received by the communication unit 110 include a downlink signal of the first communication service from the base station 10 and an uplink signal of the first communication service transmitted from another communication device to the base station 10, for example. Further, radio signals received by the communication unit 110 also include a radio signal of the second communication service transmitted from another communication device, for example. A communication protocol used for the second communication service may be IEEE802.11a/b/g/n/s, Zigbee, WiMedia or the like, for example.

The data acquisition unit 120 acquires sensed data related to a signal receiving condition in a spectrum assigned to the first communication service. Specifically, the data acquisition unit 120 may sense a receiving condition of a radio signal by the communication unit 110 and generate sensed data. The sensed data include a signal level of a radio signal received by the communication unit 110, dispersion of a signal level indicating the degree of fading, a frequency spectrum, a noise ratio (e.g. SNR or CNR), an error rate (e.g. BER or PER) or the like, for example. Further, the data acquisition unit 120 may acquire the sensed data by additionally receiving the sensed data from another communication device located in the nearby vicinity of its own device, for example. The sensed data is output from the data acquisition unit 120 to the determination unit 130.

The determination unit 130 determines in what kind of area in relation to the first communication service its own device is located based on the sensed data acquired by the data acquisition unit 120. The area in which the communication device 100 is located is classified to any one of a first area inside the service area 12 and where a signal receiving condition is suitable, a second area inside or in the peripheral part of the service area 12 and where a signal receiving condition is not suitable, and a third area outside the peripheral part of the service area 12. The first area is an area in which secondary usage of a spectrum is available as the green space under permission of a coordinator of the first communication service. The second area is an area in which secondary usage of a spectrum is available as the gray space. The third area is an area in which secondary usage of a spectrum is available as the white space.

Specifically, in the case where the communication device 100 is located in a place which is inside the service area 12 and not affected by shadowing or fading, for example, the communication device 100 can suitably receive a radio signal related to the first communication service. In this case, it is expected that the communication device 100 intermittently receives a signal of a control channel periodically transmitted from the base station 10 or an uplink signal transmitted from another communication device to the base station 10, for example, with a high signal level. Thus, the determination unit 130 can determine whether its own device is located in the first area or not by comparing the signal level (or its time average) of a received signal represented by the sensed data with a predetermined threshold, for example.

Further, in the case where the communication device 100 is located in a place which is inside the service area 12 and affected by shadowing or fading, for example, it is expected that there is a variation in the signal level of a radio signal received in the communication device 100. For example, a downlink signal from the base station 10 affected by fading or an uplink signal intermittently transmitted from another communication device to the base station 10 can cause the variation of the signal level observed in the communication device 100. Thus, the determination unit 130 can determine whether which of the second area and the third area its own device is located by comparing dispersion of the signal level of a received signal represented by the sensed data (or standard deviation according to the dispersion) with a predetermined threshold, for example.

Alternately, the determination unit 130 may determine that its own device is located in the third area when a control channel of the first communication service or an uplink signal is not detected from a received signal, for example. As a technique of detecting a downlink signal containing a signal of a control channel or an uplink signal from a received signal, a technique of detecting a header of a known packet in conformity to a communication protocol of the first communication service can be applied.

After determining the kind of the area in which its own device is located, the determination unit 130 outputs a determination result to the secondary usage starting unit 140.

The secondary usage starting unit 140 starts usage of the second communication service that uses a part or whole of a spectrum assigned to the first communication service by a procedure different depending on the determination result of the determination unit 130 (which is the kind of the area in which its own device is located).

Specifically, when it is determined that the own device is located in the first area, for example, the secondary usage starting unit 140 first requests permission for start of secondary usage to a coordinator of the first communication service. In this embodiment, the coordinator of the first communication service is the base station 10 shown in FIG. 1. However, another device that is connected by wire or wirelessly to the base station 10 or any communication device located inside the service area 12, for example, may serve as the coordinator of the first communication service. If the secondary usage starting unit 140 receives permission for start of secondary usage from the coordinator, the secondary usage starting unit 140 starts communication by the second communication service with a nearby communication device. In this case, the secondary usage starting unit 140 may restrict a transmission power, a time slot or a frequency slot, a service area or the like to be used in the second communication service based on a parameter designated or recommended by the coordinator, for example. This prevents secondary usage of a spectrum from affecting the first communication service and degrading the quality of the first communication service.

On the other hand, when it is determined that the own device is located in the second area or the third area, the secondary usage starting unit 140 starts communication by the second communication service without requesting permission to the coordinator of the first communication service. At this time, when the own device is located in the second area, which is the gray space, for example, the secondary usage starting unit 140 first detects a time slot or a frequency slot that is not used in the nearby vicinity of its own device in the spectrum assigned to the first communication service. The secondary usage starting unit 140 then uses the detected time slot or frequency slot for the second communication service.

Assume, for example, that the first communication service is a mobile phone connection service conforming to standard specification of long term evolution (LTE) using time division multiplexing (TDM). In this case, orthogonal frequency division multiple access (OFDMA) is used as a connection scheme of a downlink signal, and single-carrier frequency division multiple access (SC-FDMA) is used as a connection scheme of an uplink signal. The secondary usage starting unit 140 can recognize the timing of switching between a downlink signal and an uplink signal by performing blind detection of such a difference in connection scheme. The minimum unit of a time slot is thereby found. Then, the secondary usage starting unit 140 can detect a vacant time slot by observing each time slot.

Further, assume, for example, that the first communication service is a service using frequency division multiplexing (FDM). In this case, the secondary usage starting unit 140 can detect a vacant frequency slot by observing a spectrum of a received signal in a spectrum assigned to the first communication service for a given time period. After detecting a vacant frequency slot in FDM, the secondary usage starting unit 140 does not have to perform re-detection of a vacant slot for a longer time compared to the case of TDM.

In the case where a certain signal level different from a control channel is observed in a received signal, it is likely that the received signal is an uplink signal that is transmitted from another communication device using the first communication service in the nearby vicinity. In this case, it is preferred to take measures such as increasing the frequency of observing a vacant time slot or frequency slot, canceling the secondary usage or using a sophisticated interference control scheme in order to reduce the possibility that a communication device making secondary usage of a spectrum becomes a hidden terminal for the above-described another communication device.

Furthermore, assume, for example, that the first communication service is a digital TV broadcast service. In this case, the secondary usage starting unit 140 may monitor whether a given signal pattern (a preamble, a pilot signal etc.) is observed continuously in common to a plurality of channels, and use a channel in which such a signal pattern is not observed for the second communication service. In this case also, the secondary usage starting unit 140 does not have to perform re-detection of a vacant channel for a longer time after that compared to the case of TDM.

There may be a case where a plurality of vacant time slots or frequency slots are detected, for example. In this case, it is preferred that the secondary usage starting unit 140 preferentially uses a time slot or a frequency slot that can be used more stably for the second communication service. For example, both a fixed communication service in which directionality is given to an antenna and a communication service in which directionality is not given to an antenna exist between a base station and a communication terminal, the fixed communication service is less subject to interference. Thus, a time slot or a frequency slot that is prepared for such a fixed communication service can be preferentially used for the second communication service.

Further, for example, that the first communication service is a service using code division multiple access (CDMA). In this case, the secondary usage starting unit 140 may detect an unused code that is not used in the nearby vicinity of its own device in the first communication service. In such a case, the secondary usage starting unit 140 can use the detected unused code for the second communication service.

Further, when the own device is located in the second area, the secondary usage starting unit 140 limits a power level of a transmission signal to be used for the second communication service to a predetermined range in order to avoid an adverse effect such as interference on the first communication service used by a nearby communication device. For example, assume that an interference level accepted by the base station 10 that provides the first communication service (which is referred to hereinafter as an acceptable interference level) $I_{acc}$ and a transmission power level $T_{prm}$ from the base station 10 are known. Further, a reception level of a downlink signal of the first communication service contained in sensed data acquired by the data acquisition unit 120 is $L_{sen}$. Then, a propagation loss of a power level in a communication path from the base station 10 to the communication device 100 can be calculated as $P_{loss}=T_{prm}-L_{sen}$. In this case, the secondary usage starting unit 140 can limit a power level $T_{sec}$ of a transmission signal to be used for the second communication service within the range of $T_{sec}<I_{acc}+P_{loss}$, for example. Consequently, even if a transmission signal used for the second communication service reaches the base station 10, a reception level of the transmission signal in the base station 10 decreases from the power level $T_{sec}$ upon transmission by the amount of the propagation loss $P_{loss}$ to become less than the acceptable interference level $I_{acc}$. Note that, the secondary usage starting unit 140 may determine the range of a power level of a transmission signal to be used for the second communication service by using the acceptable interference level and the transmission power level of a nearby another communication device using the first communication service rather than the base station 10. Further, the secondary usage starting unit 140 may determine the range of a power level of a transmission signal to be used for the second communication service by using a value of minimum receiving sensitivity instead of the acceptable interference level of the base station 10 or another communication device.

In LTE, because a transmission power level and a phase that are both known are used for a downlink reference signal and an uplink demodulation reference signal, the propagation loss of a power level in a communication path can be calculated according to the above-described idea. However, in a communication system where transmission power control is performed, there is a possibility that the transmission power level $T_{prm}$ of the first communication service to be sensed is not easily found. In this case, the secondary usage starting unit 140 may acquire a communication distance from a target of sensing from GPS data or the like, for example, and calculate the transmission power level $T_{prm}$ based on the acquired communication distance and the above-described reception level $L_{sen}$. Further, when the first communication service is a communication service in conformity with WiMAX, for example, the secondary usage starting unit 140 may make an inquiry about the transmission power level $T_{prm}$ to the base station 10 by random access using CDMA ranging region of WiMAX.

Further, the secondary usage starting unit 140 may use an interference control technique such as beam forming, for example, in combination. For example, the secondary usage starting unit 140 may find a relative positional relationship with a nearby communication device based on the sensed data and determine an appropriate shape of a transmitting and receiving beam. Further, the secondary usage starting unit 140 may reduce a transmission power of every one hop by performing multi-hop routing between users of the second communication service, for example. Furthermore, the secondary usage starting unit 140 may reduce the possibility of interference by providing an unused blank range in the vicinity of a slot to be used for the second communication service in a vacant time slot or frequency slot. By using such an interference control technique, the secondary usage starting unit 140 can safely start secondary usage of a spectrum in the second area, which is the gray space.

On the other hand, when the own device is located in the third area, which is the white space, the secondary usage starting unit 140 starts usage of the second communication service by using the spectrum assigned to the first communication service.

Note that, when a radio signal conforming to the second communication service that has been already started by another communication device is detected, the secondary usage starting unit 140 may join the second communication service. Which of the first communication service and the second communication service a radio signal received by the communication unit 110 conforms to can be determined according to a communication protocol identified from a header of a signal or the like.

2-2. Flow of Processing

Figure 4:
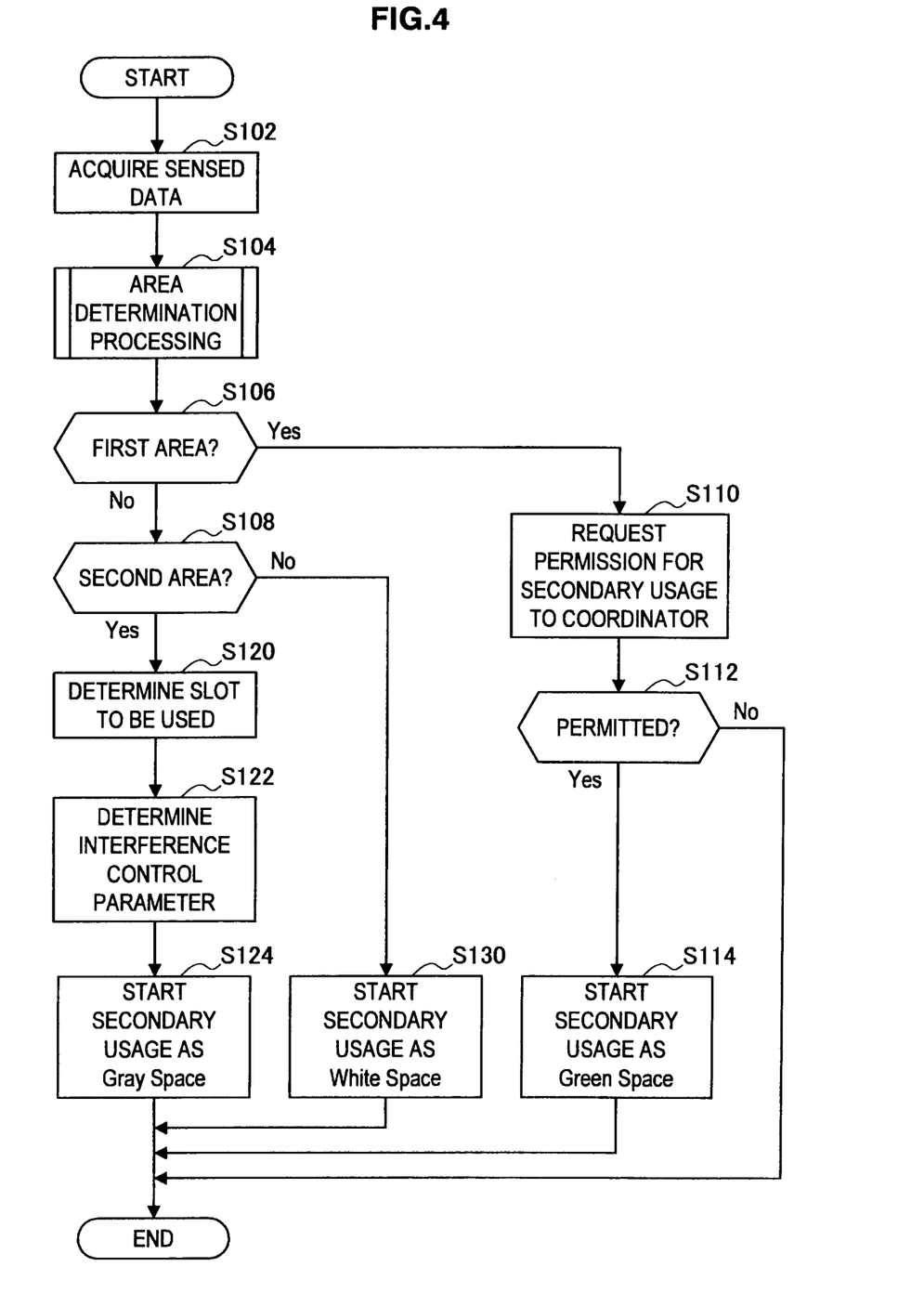
FIG. 4 is a flowchart showing an example of a flow of a communication control process up to start of secondary usage according to the first embodiment.

A flow of a communication control process up to start of secondary usage according to the embodiment is described hereinafter with reference to FIGS. 4 and 5. FIG. 4 is a flowchart showing an example of a flow of a communication control process up to start of secondary usage in the communication device 100 described above.

Referring to FIG. 4, receiving an instruction for start of secondary usage of a spectrum from a user or a given application, the data acquisition unit 120 acquires sensed data related to a signal receiving condition in a spectrum assigned to the first communication service (S102). Next, the determination unit 130 performs area determination processing for determining the kind of the area in which the communication device 100 is located based on the sensed data (S104). The area determination processing is further described later with reference to FIG. 5. After that, the process branches depending on in which of the first area, the second area and the third area the communication device 100 is located (S106, S108).

First, if it is determined that the communication device 100 is located in the first area, the secondary usage starting unit 140 requests permission for secondary usage of the spectrum to a coordinator of the first communication service (S110). The process further branches depending on whether secondary usage of the spectrum is permitted by the coordinator (S112). If secondary usage of the spectrum is permitted, the secondary usage starting unit 140 starts secondary usage of the spectrum as the green space (S114). On the other hand, if secondary usage of the spectrum is not permitted, the secondary usage starting unit 140 ends the process without starting secondary usage of the spectrum.

Further, if it is determined that the communication device 100 is located in the second area, the secondary usage starting unit 140 determines a time slot or a frequency slot (or a code in CDMA) to be used for secondary usage by the above-described technique (S120). Next, the secondary usage starting unit 140 determines an interference control parameter (S122). Specifically, the secondary usage starting unit 140 determines a power level of a transmission signal to be used for the second communication service based on known transmission power level and acceptable interference level of the first communication service and a reception level of a downlink signal contained in sensed data. After that, the secondary usage starting unit 140 starts secondary usage of the spectrum as the green space (S124).

Furthermore, if it is determined that the communication device 100 is located in the third area, the secondary usage starting unit 140 starts secondary usage of the spectrum as the white space (S130).

Figure 5:
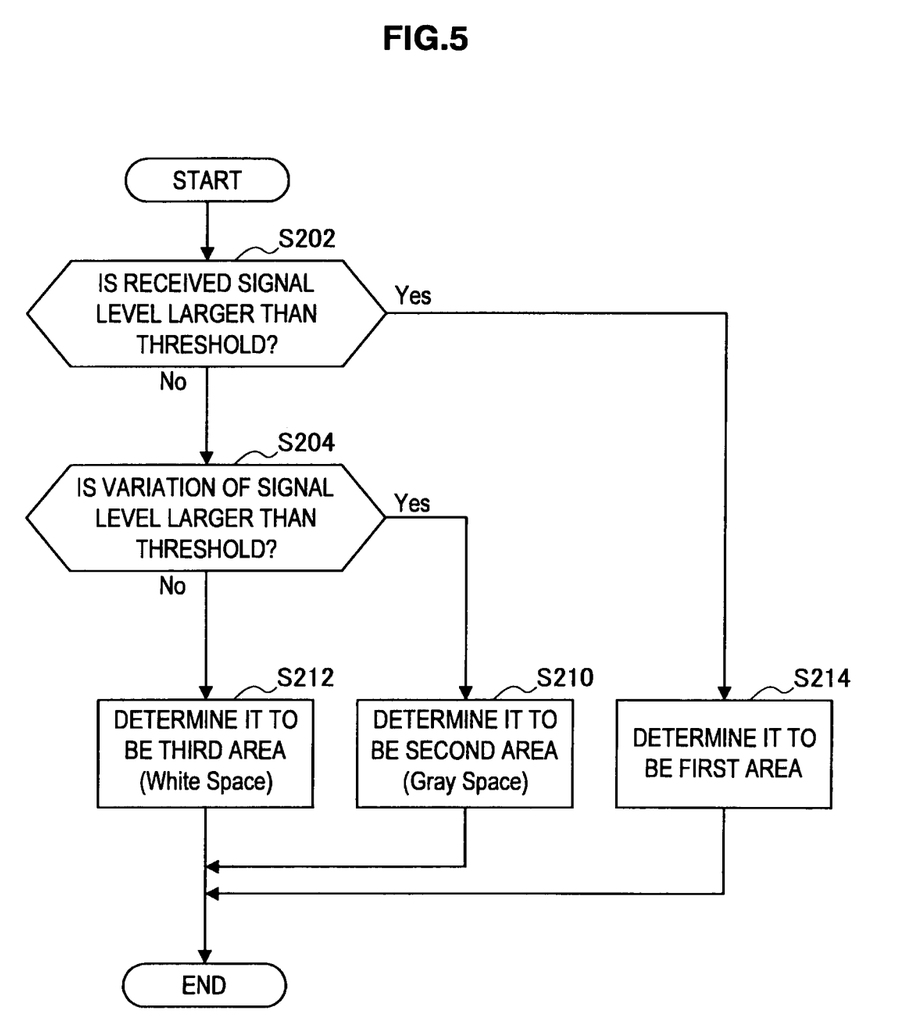
FIG. 5 is a flowchart showing an example of a detailed flow of area determination processing according to the first embodiment.

FIG. 5 is a flowchart showing an example of a detailed flow of area determination processing (step S104 in FIG. 4) by the determination unit 130.

Referring to FIG. 5, the determination unit 130 first determines whether the signal level of a received signal is larger than a predetermined threshold based on the sensed data acquired by the data acquisition unit 120 (S202). If the signal level of the received signal is larger than the predetermined threshold, the determination unit 130 determines that its own device is located in the first area, which is not the gray space or the white space (S214). On the other hand, if the signal level of the received signal is smaller than the predetermined threshold, the process proceeds to step S204.

In the step S204, the determination unit 130 determines whether variation of the signal level of the received signal (e.g. dispersion of the signal level for a certain period of time) is larger than a predetermined threshold based on the sensed data acquired by the data acquisition unit 120 (S204). If the variation of the signal level of the received signal is larger than the predetermined threshold, the determination unit 130 determines that its own device is located in the second area, which is the gray space (S210). On the other hand, if the variation of the signal level of the received signal is smaller than the predetermined threshold, the determination unit 130 determines that its own device is located in the third area, which is the white space (S212).

The communication device 100 according to the first embodiment of the present invention is described above with reference to FIGS. 2 to 5. According to the embodiment, the communication device 100 identifies the kind of the area in which its own device is located according to a signal receiving condition of the first communication service and starts secondary usage of a spectrum by a procedure different depending on the kind. Therefore, even when the communication device 100 is located in an area which is not the white space, such as the gray space or the green space described above, for example, it is possible to safely start secondary usage of a spectrum without affecting the quality of the first communication service.

It should be noted that, as a technique of making a group of users joining secondary usage of a spectrum in one spectrum hole, a group may be made according to position data and an average received power density of each user (each communication device). In this case, efficiency and safety of secondary usage of a spectrum can be enhanced by dividing users in accordance with an average received power density and making a plurality of groups, for example.

3. Description of Second Embodiment

In the first embodiment, an example in which communication devices located in the first, second or third area individually establish a communication network by secondary usage of a spectrum is described. However, when a plurality of communication devices are located in different kinds of areas in close proximity to each other, for example, the communication devices may establish a communication network involving the first, second or third area in coordination with each other and extend the service area of the second communication service.

Figure 6:
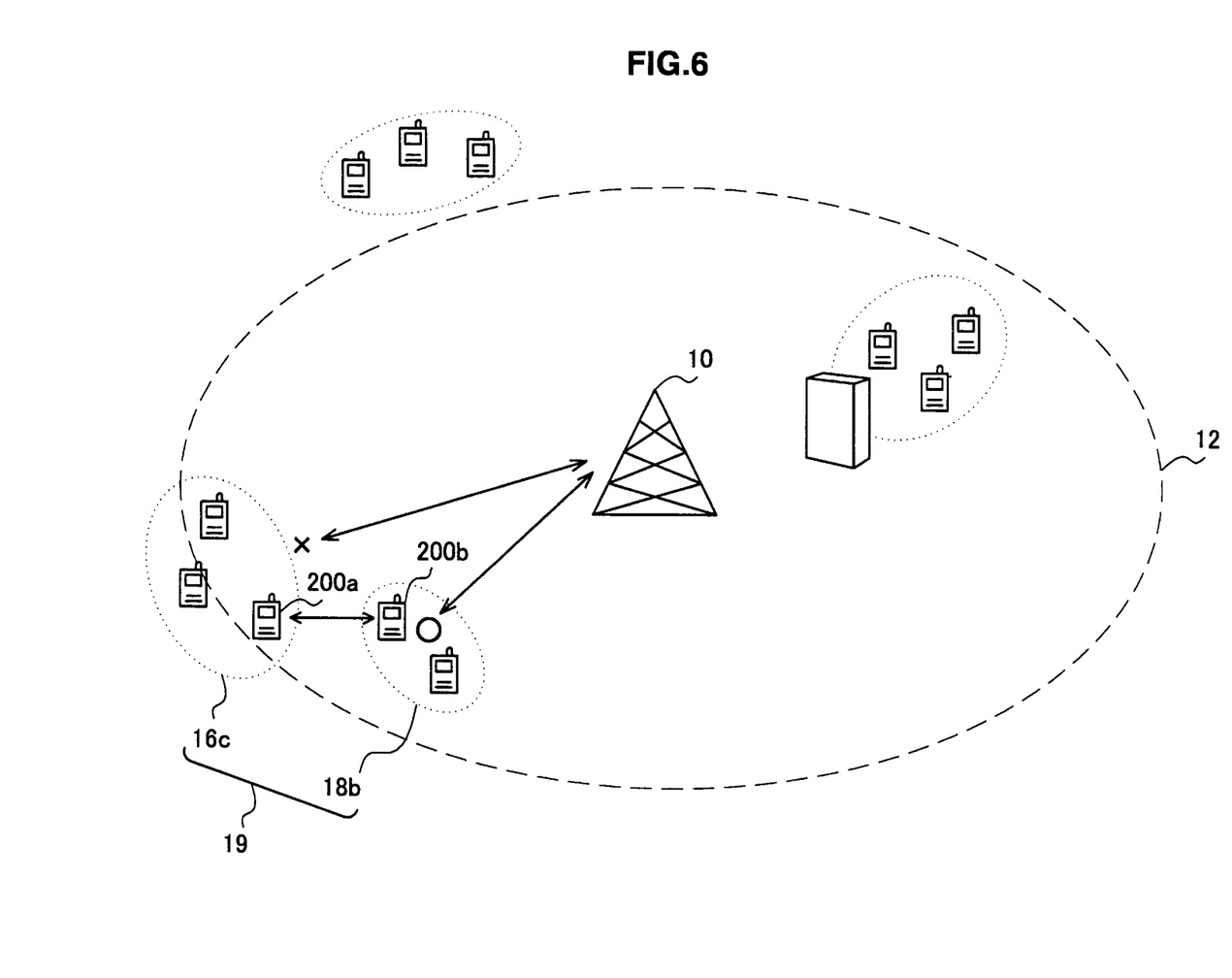
FIG. 6 is a schematic view showing extension of a service area established by secondary usage of a spectrum.

FIG. 6 is a schematic view showing extension of a service area established by secondary usage of a spectrum. Referring to FIG. 6, communication devices 200a and 200b are located inside the service area 12 of the first communication service centering on the base station 10. An area 16c in which the communication device 200a is located is the above-described gray space. On the other hand, the communication device 200b establishes an area 18b which is the green space under permission of the base station 10. The communication devices 200a and 200b can transmit and receive signals because they are located in close proximity to each other. Thus, by negotiation between the communication devices 200a and 200b, the green space and the gray space can be merged to establish an extended service area 19 of the second communication service.

Therefore, in this section, an example of extending the service area of the second communication service by coordination between communication devices located in close proximity to each other, such as the communication devices 200a and 200b shown in FIG. 6, is described as a second embodiment of the present invention.

[3-1. Configuration of Communication Device]

Figure 7:
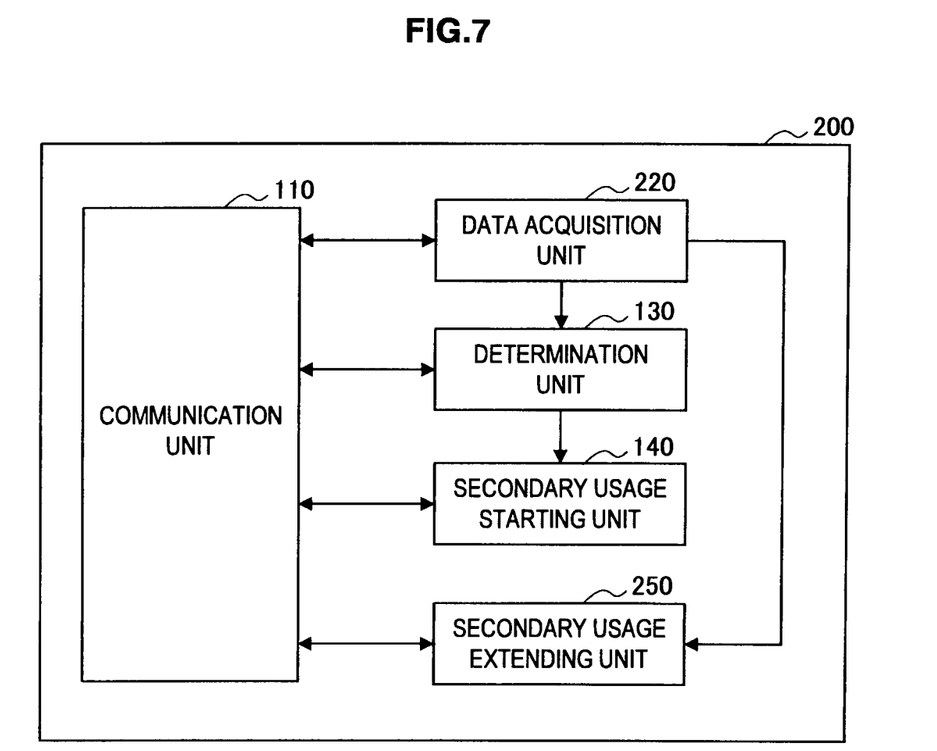
FIG. 7 is a block diagram showing an example of a logical configuration of a communication device according to a second embodiment.

A hardware configuration of the communication device 200 according to the embodiment can be the same as the hardware configuration of the communication device 100 according to the first embodiment shown in FIG. 2, for example. FIG. 7 is a block diagram showing an example of a logical configuration of the communication device 200 according to the embodiment. Referring to FIG. 7, the communication device 200 includes a communication unit 110, a data acquisition unit 220, a determination unit 130, a secondary usage starting unit 140 and a secondary usage extending unit 250.

The data acquisition unit 220 acquires sensed data related to a signal receiving condition in a spectrum assigned to the first communication service, just like the data acquisition unit 120 of the communication device 100 according to the first embodiment. Further, after the second communication service is started by the secondary usage starting unit 140, the data acquisition unit 220 collects profile data related to the second communication service (which is referred to hereinafter as secondary usage profile). The secondary usage profile can contain sensed data obtained by sensing a communication environment in the second communication service, an identifier and capability data (data related to a function of a device) of a device joining the second communication service and so on, for example. The secondary usage profile is output from the data acquisition unit 220 to the secondary usage extending unit 250.

The secondary usage extending unit 250 negotiates with another communication device located nearby and extends the service area of the second communication service in response to an instruction for extension of the second communication service from a user or a given application, for example. When the own device is making secondary usage of the spectrum in the second area, which is the gray space, for example, the secondary usage extending unit 250 checks the existence of another communication device establishing the green space in its close proximity by a method such as beaconing. At this time, a beacon transmitted from the secondary usage extending unit 250 through the communication unit 110 may contain the above-described secondary usage profile that is collected by the data acquisition unit 220, for example. Then, the secondary usage extending unit 250 can exchange a parameter or the like recommended for extending the service area of the second communication service with another communication device that has responded to the beacon and extend the service area. The recommended parameter may be a transmission power, a time slot or a frequency slot, position data of another communication device, data designating an interference control scheme or the like to be used in the second communication service after extension, for example.

Further, when the own device is making secondary usage of the spectrum by establishing the green space under permission of the coordinator of the first communication service, for example, the secondary usage extending unit 250 can receive the above-described beacon from another communication device located nearby. In this case, the secondary usage extending unit 250 requests permission for extension of the service area of the second communication service to a coordinator of the first communication service. At this time, the secondary usage extending unit 250 may transmit the secondary usage profile contained in the beacon to the coordinator. After that, the secondary usage extending unit 250 receives a result of authentication according to the contents of the secondary usage profile and a recommended parameter when extension is permitted, for example, from the coordinator. When extension of the service area of the second communication service is permitted, the secondary usage extending unit 250 can exchange the parameter or the like with the communication device from which the beacon has been transmitted and extend the service area of the second communication service.

For transmission and reception of a beacon and exchange of a parameter or the like by the secondary usage extending unit 250, a communication protocol such as ultra wide band (UWB) or IEEE 802.11s, for example, that uses a spectrum different form that of the first communication service may be used.

[3-2. Flow of Processing]

Figure 8:
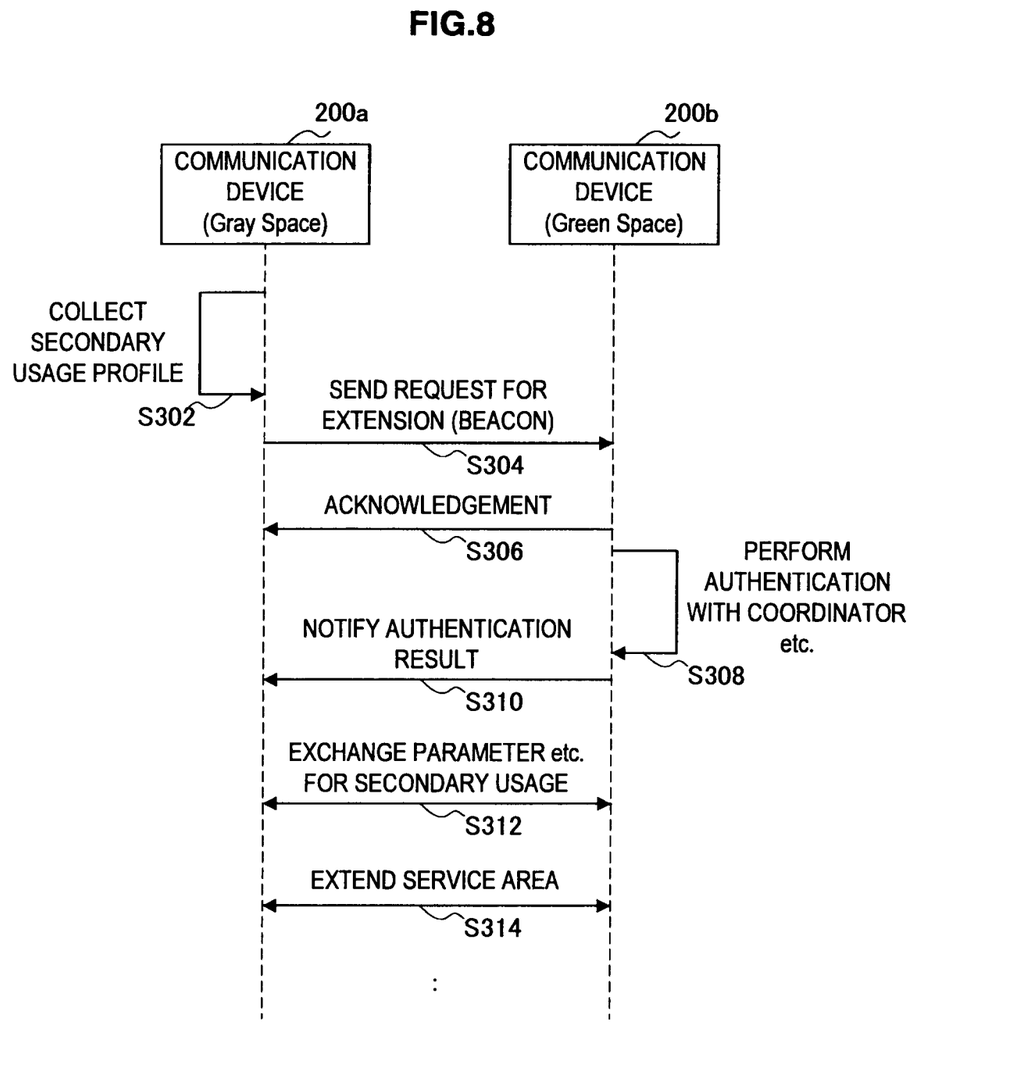
FIG. 8 is a sequence chart showing an example of a flow of negotiation between communication devices upon extension of secondary usage according to the second embodiment.

FIG. 8 is a sequence chart showing an example of a flow of negotiation between communication devices upon extension of secondary usage according to the embodiment. A case where the communication device 200a located in the gray space negotiates with the nearby communication device 200b located in the green space about extension of a service area is described hereinafter by way of illustration.

Referring to FIG. 8, the data acquisition unit 220 of the communication device 200a collects the above-described secondary usage profile firstly (S302). Next, the secondary usage extending unit 250 of the communication device 200a transmits a beacon for requesting extension of the service area of the second communication service to communication devices in the nearby vicinity (S304).

The beacon is received by the communication device 200b in close proximity, for example. Then, the communication device 200b transmits an acknowledgement to the communication device 200a (S306). After that, the secondary usage extending unit 250 of the communication device 200b transmits the secondary usage profile contained in the received beacon to the coordinator of the first communication service, for example, and requests authentication for extension of the service area (S308). Receiving a result of authentication indicating permission or rejection for extension of the service area from the coordinator, the secondary usage extending unit 250 of the communication device 200b transmits the result of authentication to the communication device 200a (S310).

When extension of the service area is permitted, a parameter or the like for extension of the service area is exchanged between the secondary usage extending unit 250 of the communication device 200a and the secondary usage extending unit 250 of the communication device 200b (S312). Consequently, the second communication service as the gray space by the communication device 200a and the second communication service as the green space by the communication device 200b are connected, and the service area of the second communication service is extended (S314).

According to the second embodiment of the present invention described above, the service area of the second communication service is extended by negotiation between communication devices located in different kinds of areas. Even when a communication device is located in the gray space and unable to directly communicate with a coordinator of the first communication service, for example, the device can receive permission for extension of the service area from the coordinator through another communication device establishing the green space. This provides a larger number of users with a chance to make secondary usage of a spectrum, and it is thereby possible to enhance the efficient use of limited spectrums.

The subject matter of each embodiment described in this specification is applicable to various types of modes of secondary usage. For example, as described above, it can be said that operation of relay node or femto-cell to cover a spectrum hole of the first communication service is a mode of secondary usage of spectrum. Further, the relationship between any one or more of macro-cell, RRH (Remote Radio Head), Hot-zone, relay node, femto-cell and the like may form a mode of secondary usage of spectrum (such as heterogeneous network).

It should be understood by those skilled in the art that various modifications, combinations, sub-combinations and alterations may occur depending on design requirements and other factors insofar as they are within the scope of the appended claims or the equivalents thereof.

For example, the communication control process for starting or extending secondary usage of a spectrum described with reference to FIGS. 4, 5 and 8 is not necessarily executed according to the sequence shown in each figure. Specifically, the processing steps may be executed in different order or in parallel, or another processing step may be added.

The present application contains subject matter related to that disclosed in Japanese Priority Patent Application JP 2009-130092 filed in the Japan Patent Office on May 29, 2009 and Japanese Priority Patent Application JP 2010-010407 filed in the Japan Patent Office on Jan. 20, 2010, the entire contents of which are hereby incorporated by reference.

What is claimed is:

1. A communication device comprising:
a data acquisition unit that acquires, by using a processor, sensed data related to a signal receiving condition in a spectrum assigned to a first communication service;
a determination unit that determines, by using a processor, which of a first area inside a service area of the first communication service where a signal receiving condition is suitable, a second area inside or in a peripheral part of the service area where a signal receiving condition is not suitable and a third area outside the service area the communication device is located based on the sensed data acquired by the data acquisition unit, wherein the determination unit determines whether the communication device is located in the first area or not based on a signal level of a received signal in the spectrum, and the determination unit further determines that the communication device is located in the third area when a control channel or an uplink signal of the first communication service is not detected; and
a secondary usage starting unit that starts, by using a processor, usage of a second communication service using a part or whole of the spectrum assigned to the first communication service by a procedure different depending on a kind of the area where the communication device is located determined by the determination unit.

2. The communication device according to claim 1, wherein when it is determined that the communication device is located in the second area or the third area, the secondary usage starting unit starts usage of the second communication service without requesting permission to a coordinator of the first communication service.

3. The communication device according to claim 2, wherein when it is determined that the communication device is located in the second area, the secondary usage starting unit detects a time slot, a frequency slot or a code not used in nearby vicinity of the communication device in the spectrum and starts usage of the second communication service by using the detected time slot, frequency slot or code.

4. The communication device according to claim 2, wherein when it is determined that the communication device is located in the second area, the secondary usage starting unit limits a power level of a transmission signal for the second communication service within a range determined based on the sensed data.

5. The communication device according to claim 1, wherein the determination unit further determines which of the second area and the third area the communication device is located based on a degree of fading appearing in a received signal in the spectrum.

6. The communication device according to claim 1, wherein when it is determined that the communication device is located in the first area, the secondary usage starting unit requests permission for starting usage of the second communication service to a coordinator of the first communication service.

7. A communication device comprising:
a data acquisition unit that acquires, by using a processor, sensed data related to a signal receiving condition in a spectrum assigned to a first communication service;
a determination unit that determines, by using a processor, which of a first area inside a service area of the first communication service where a signal receiving condition is suitable, a second area inside or in a peripheral part of the service area where a signal receiving condition is not suitable and a third area outside the service area the communication device is located based on the sensed data acquired by the data acquisition unit;
a secondary usage starting unit that starts, by using a processor, usage of a second communication service using a part or whole of the spectrum assigned to the first communication service by a procedure different depending on a kind of the area where the communication device is located determined by the determination unit; and
a secondary usage extending unit that extends a service area of the second communication service by negotiating with another communication device located in nearby vicinity of the communication device and using the second communication service under permission of a coordinator of the first communication service.

8. A communication control method comprising the steps of:
acquiring sensed data related to a signal receiving condition in a spectrum assigned to a first communication service;
determining which of a first area inside a service area of the first communication service where a signal receiving condition is suitable, a second area inside or in a peripheral part of the service area where a signal receiving condition is not suitable and a third area outside the service area a communication device is located based on the acquired sensed data;
determining whether the communication device is located in the first area or not based on a signal level of a received signal in the spectrum;
determining that the communication device is located in the third area when a control channel or an uplink signal of the first communication service is not detected; and starting usage of a second communication service using a part or whole of the spectrum assigned to the first communication service by a procedure different depending on a kind of the area where the communication device is located.

9. The communication device according to claim 7, wherein when it is determined that the communication device is located in the second area or the third area, the secondary usage starting unit starts usage of the second communication service without requesting permission to a coordinator of the first communication service.

10. The communication device according to claim 9, wherein when it is determined that the communication device is located in the second area, the secondary usage starting unit detects a time slot, a frequency slot or a code not used in nearby vicinity of the communication device in the spectrum and starts usage of the second communication service by using the detected time slot, frequency slot or code.

11. The communication device according to claim 9, wherein when it is determined that the communication device is located in the second area, the secondary usage starting unit limits a power level of a transmission signal for the second communication service within a range determined based on the sensed data.

12. The communication device according to claim 7, wherein the determination unit further determines which of the second area and the third area the communication device is located based on a degree of fading appearing in a received signal in the spectrum.

13. The communication device according to claim 7, wherein when it is determined that the communication device is located in the first area, the secondary usage starting unit requests permission for starting usage of the second communication service to a coordinator of the first communication service.

14. The communication device according to claim 8, wherein when it is determined that the communication device is located in the second area or the third area, the secondary usage starting unit starts usage of the second communication service without requesting permission to a coordinator of the first communication service.

15. The communication device according to claim 14, wherein when it is determined that the communication device is located in the second area, the secondary usage starting unit detects a time slot, a frequency slot or a code not used in nearby vicinity of the communication device in the spectrum and starts usage of the second communication service by using the detected time slot, frequency slot or code.

16. The communication device according to claim 14, wherein when it is determined that the communication device is located in the second area, the secondary usage starting unit limits a power level of a transmission signal for the second communication service within a range determined based on the sensed data.

17. The communication device according to claim 8, wherein the determination unit further determines which of the second area and the third area the communication device is located based on a degree of fading appearing in a received signal in the spectrum.

18. The communication device according to claim 8, wherein when it is determined that the communication device is located in the first area, the secondary usage starting unit requests permission for starting usage of the second communication service to a coordinator of the first communication service.

19. A communication control method comprising the steps of:
acquiring sensed data related to a signal receiving condition in a spectrum assigned to a first communication service;
determining which of a first area inside a service area of the first communication service where a signal receiving condition is suitable, a second area inside or in a peripheral part of the service area where a signal receiving condition is not suitable and a third area outside the service area a communication device is located based on the acquired sensed data;
starting usage of a second communication service using a part or whole of the spectrum assigned to the first communication service by a procedure different depending on a kind of the area where the communication device is located; and
extending a service area of the second communication service by negotiating with another communication device located in nearby vicinity of the communication device and using the second communication service under permission of a coordinator of the first communication service.

20. The communication device according to claim 19, wherein when it is determined that the communication device is located in the second area or the third area, the secondary usage starting unit starts usage of the second communication service without requesting permission to a coordinator of the first communication service.

21. The communication device according to claim 20, wherein when it is determined that the communication device is located in the second area, the secondary usage starting unit detects a time slot, a frequency slot or a code not used in nearby vicinity of the communication device in the spectrum and starts usage of the second communication service by using the detected time slot, frequency slot or code.

22. The communication device according to claim 20, wherein when it is determined that the communication device is located in the second area, the secondary usage starting unit limits a power level of a transmission signal for the second communication service within a range determined based on the sensed data.

23. The communication device according to claim 19, wherein the determination unit further determines which of the second area and the third area the communication device is located based on a degree of fading appearing in a received signal in the spectrum.

24. The communication device according to claim 19, wherein when it is determined that the communication device is located in the first area, the secondary usage starting unit requests permission for starting usage of the second communication service to a coordinator of the first communication service.

* * * * *